(12) United States Patent
Podkopayev (10) Patent No.: US 10,655,378 B2
(45) Date of Patent: May 19, 2020

(54) POWER SIDE DOOR ACTUATOR WITH ROTATING DRIVE NUT

(71) Applicant: Magna Closures Inc., Newmarket (CA)

(72) Inventor: Vadym Podkopayev, Oro-Medonte (CA)

(73) Assignee: MAGNA CLOSURES INC., Newmarket (CA)

( * ) Notice: Subject to any disclaimer, the term of this patent is extended or adjusted under 35 U.S.C. 154(b) by 54 days.

(21) Appl. No.: 15/884,582

(22) Filed: Jan. 31, 2018

(65) Prior Publication Data

US 2018/0223583 A1    Aug. 9, 2018

Related U.S. Application Data

(60) Provisional application No. 62/455,634, filed on Feb. 7, 2017.

(51) Int. Cl.

| E05F 11/24 | (2006.01) |
|---|---|
| E05F 15/622 | (2015.01) |
| F16D 3/207 | (2006.01) |
| F16D 3/46 | (2006.01) |
| F16H 25/20 | (2006.01) |
| F16H 37/04 | (2006.01) |
| F16D 3/202 | (2006.01) |
| B60J 5/04 | (2006.01) |

(52) U.S. Cl.
CPC .......... *E05F 15/622* (2015.01); *F16D 3/207* (2013.01); *F16D 3/46* (2013.01); *F16H 25/20* (2013.01); *F16H 37/04* (2013.01); *B60J 5/047* (2013.01); *E05Y 2201/46* (2013.01); *E05Y 2201/636* (2013.01); *E05Y 2201/70* (2013.01); *E05Y 2201/702* (2013.01); *E05Y 2400/322* (2013.01); *E05Y 2900/531* (2013.01); *F16D 2003/2026* (2013.01); *F16H 2025/2031* (2013.01); *F16H 2025/2062* (2013.01); *F16H 2025/2081* (2013.01); *F16H 2025/2087* (2013.01)

(58) Field of Classification Search
CPC ............... E05F 15/622; F16D 3/207; F16D 2003/2026; F16D 3/46; F16H 25/20; F16H 37/06; F16H 2025/2062; F16H 2025/2031; F16H 2025/2081; F16H 25/12; E05Y 2201/702; E05Y 2201/636; E05Y 2201/70; E05Y 2900/531; B60J 5/047
USPC ................... 49/339, 340, 341, 343
See application file for complete search history.

(56) References Cited

U.S. PATENT DOCUMENTS

| 3,398,484 | A | * | 8/1968 | Toru | E05F 15/622 318/268 |
|---|---|---|---|---|---|
| 4,644,693 | A | * | 2/1987 | Wang | E05F 15/619 49/280 |
| 4,934,203 | A | * | 6/1990 | Bailey | F16H 25/2204 254/103 |

(Continued)

FOREIGN PATENT DOCUMENTS

| WO | WO0200459 A2 | 1/2002 |
|---|---|---|
| WO | WO2009034141 A1 | 3/2009 |
| WO | WO2016164023 A1 | 10/2016 |

*Primary Examiner* — Jerry E Redman
(74) *Attorney, Agent, or Firm* — Dickinson Wright PLLC (57) ABSTRACT

A power door actuation system including a swing door actuator assembly having a rotatable drive nut assembly operable to move the door between a closed position and at least one open position to provide a power opening and closing function.

20 Claims, 9 Drawing Sheets

(56) References Cited

U.S. PATENT DOCUMENTS

| | | | | |
|---|---|---|---|---|
| 5,873,200 | A * | 2/1999 | Henderson | E05F 15/63 49/340 |
| 6,223,469 | B1 * | 5/2001 | Moll | E05F 15/611 49/341 |
| 7,226,111 | B2 * | 6/2007 | Berklich, Jr. | B60J 5/101 296/146.4 |
| 7,243,976 | B2 * | 7/2007 | Okada | E05F 15/619 296/146.4 |
| 8,171,673 | B2 * | 5/2012 | Helms | E05F 15/622 296/106 |
| 8,596,153 | B2 * | 12/2013 | Arenz | E05F 15/627 49/337 |
| 9,174,517 | B2 | 11/2015 | Scheuring et al. | |
| 9,353,566 | B2 * | 5/2016 | Miu | E05F 15/611 |
| 9,650,824 | B2 * | 5/2017 | Sauerwein | E05F 5/00 |
| 9,650,826 | B2 * | 5/2017 | Potter | E05F 15/614 |
| 10,240,386 | B2 * | 3/2019 | Wise | E05F 15/75 |
| 2004/0113456 | A1 * | 6/2004 | Greuel | E05F 15/622 296/146.8 |
| 2007/0175099 | A1 * | 8/2007 | Kachouh | E05F 15/611 49/340 |
| 2008/0163709 | A1 * | 7/2008 | Choi | F16M 11/08 74/89.14 |
| 2008/0295408 | A1 * | 12/2008 | Heissler | E05F 15/619 49/324 |
| 2009/0051192 | A1 * | 2/2009 | Ewing | E05F 15/622 296/146.2 |
| 2009/0113803 | A1 * | 5/2009 | Arenz | E05F 15/622 49/358 |
| 2010/0050524 | A1 * | 3/2010 | Helms | E05F 15/622 49/26 |
| 2011/0302841 | A1 * | 12/2011 | Ye | E05F 15/622 49/340 |
| 2012/0000304 | A1 * | 1/2012 | Hamminga | E05F 15/41 74/89.23 |
| 2012/0143195 | A1 * | 6/2012 | Sander | A61B 17/162 606/80 |
| 2012/0245800 | A1 * | 9/2012 | Koberstaedt | B60J 5/101 701/49 |
| 2014/0150581 | A1 * | 6/2014 | Scheuring | B60J 5/047 74/89.38 |
| 2014/0338480 | A1 * | 11/2014 | Wu | F16H 25/20 74/89.23 |
| 2015/0059250 | A1 * | 3/2015 | Miu | E05F 15/611 49/349 |
| 2015/0283886 | A1 * | 10/2015 | Nania | E05F 15/73 296/146.4 |
| 2016/0160551 | A1 * | 6/2016 | Lutz | E05D 11/1064 74/469 |
| 2016/0290455 | A1 * | 10/2016 | Schumann | F16D 23/12 |
| 2016/0298695 | A1 * | 10/2016 | Parker | F16D 3/185 |
| 2017/0211671 | A1 * | 7/2017 | Nakayama | F16H 25/20 |
| 2017/0292310 | A1 | 10/2017 | Podkopayev | |
| 2017/0356565 | A1 * | 12/2017 | Kwasniewski | F16K 31/535 |
| 2018/0010372 | A1 * | 1/2018 | Rucha | E05C 17/006 |
| 2018/0051502 | A1 * | 2/2018 | Roos | E05F 15/622 |
| 2018/0179788 | A1 * | 6/2018 | Oxley | E05F 15/60 |
| 2018/0238098 | A1 * | 8/2018 | Rhode | E05F 15/73 |
| 2018/0258682 | A1 * | 9/2018 | Schatz | E05F 15/614 |
| 2019/0112859 | A1 * | 4/2019 | Cumbo | E05F 15/619 |
| 2019/0145137 | A1 * | 5/2019 | Ueno | E05C 17/203 |

* cited by examiner

POWER SIDE DOOR ACTUATOR WITH ROTATING DRIVE NUT

CROSS-REFERENCE TO RELATED APPLICATION

This application claims the benefit of U.S. Provisional Application Ser. No. 62/455,634, filed Feb. 7, 2017, which is incorporated herein by reference in its entirety.

FIELD

The present disclosure relates generally to door systems for motor vehicles and, more particularly, to a power door actuation system for moving a swinging vehicle door relative to a vehicle body between an open position and a closed position.

BACKGROUND

This section provides background information related to the present disclosure which is not necessarily prior art.

Passenger doors on motor vehicles are typically mounted by upper and lower door hinges to the vehicle body for swinging movement about a generally vertical pivot axis. Each door hinge typically includes a door hinge strap connected to the passenger door, a body hinge strap connected to the vehicle body, and a pivot pin arranged to pivotably connect the door hinge strap to the body hinge strap and define the pivot axis. Such swinging passenger doors ("swing doors") have recognized issues such as, for example, when the vehicle is situated on an inclined surface and the swing door either opens too far or swings shut due to the unbalanced weight of the door. To address this issue, most passenger doors have some type of detent or check mechanism integrated into at least one of the door hinges that functions to inhibit uncontrolled swinging movement of the door by positively locating and holding the door in one or more mid-travel positions in addition to a fully-open position. In some high-end vehicles, the door hinge may include an infinite door check mechanism which allows the door to be opened and held in check at any desired open position. One advantage of passenger doors equipped with door hinges having an infinite door check mechanism is that the door can be located and held in any position to avoid contact with adjacent vehicles or structures.

As a further advancement, power door actuation systems have been developed which function to automatically swing the passenger door about its pivot axis between the open and closed positions. Typically, power door actuation systems include a power-operated device such as, for example, an electric motor and a rotary-to-linear conversion device that are operable for converting the rotary output of the electric motor into translational movement of an extensible member. The electric motor and the conversion device are typically mounted inside the passenger door and the distal end of the extensible member is fixedly secured to the vehicle body. One example of such a power door actuation system is shown in commonly-owned U.S. Pat. No. 9,174,517 which discloses use of a rotary-to-linear conversion device having an externally-threaded leadscrew coaxially aligned with and fixed to an output shaft of an electric motor so as to be rotatively driven thereby with an internally-threaded drive nut meshingly engaged with the leadscrew for translation along the rotating leadscrew and to which the extensible member is attached. Accordingly, control over the speed and direction of rotation of the leadscrew results in control over the speed and direction of translational movement of the drive nut and the extensible member for controlling swinging movement of the passenger door between its open and closed positions.

While such power door actuation systems function satisfactorily for their intended purpose, one recognized drawback relates to their packaging requirements. Specifically, since power door actuation systems rely on linear motion of the extensible member, the electric motor and conversion device must necessarily be packaged in a generally horizontal orientation within the passenger door and with respect to at least one of the door hinges, and with the leadscrew and output shaft of the motor being fixed in coaxial relation with one another, ample space must be provided to accommodate the rather lengthy system. As such, the application of such conventional power door actuation systems may be limited, particularly to only those vehicular doors where such an orientation would not cause interference with existing hardware and mechanisms such as for example, the glass window function, the power wiring and harnesses, and the like. Put another way, the size of known power door actuation systems coupled with the translational motion of the nut and extensible member fixed thereto requires the availability of a significant amount of internal space within the cavity of the passenger door.

In view of the above, there remains a need to develop alternative power door actuation systems which address and overcome packaging limitations associated with known power door actuation systems as well as to provide increased applicability while reducing cost and complexity.

SUMMARY

This section provides a general summary of the present disclosure and is not a comprehensive disclosure of its full scope or all of its features, aspects and objectives.

It is an aspect of the present disclosure to provide a power door actuation system for swing doors in motor vehicles that can be effectively packaged within the cavity of the door.

It is another aspect of the present disclosure to provide a power door actuation system for swing doors in motor vehicles having a power swing door actuator mechanism that can be packaged and oriented to have a reduced effect on the door's mass moment of inertia relative to a pivot axis of the door hinge.

In addition to these and other aspects and objectives, the power door actuation system of the present disclosure is operable to provide power open and power close functionality (via remote key fob and/or internal and external handle switches); provide infinite door check functionality via software and electronics; provide contact obstacle detection via software and electronics; and provide noncontact obstacle detection via control software and electronics.

Based on these and other aspects and objectives of the present disclosure, a power swing door actuation system is provided for moving a passenger door of a motor vehicle about a pivot axis between open and closed positions relative to a vehicle body. The system includes a power-operated actuator mechanism having a housing secured to the swing door with an electric motor mounted in the housing. A drive spindle is rotatably driven by the motor about a spindle axis, wherein the drive spindle operably drives a drive nut assembly rotatably about a leadscrew axis of a leadscrew. The leadscrew is configured in threaded engagement with a drive nut of the drive nut assembly and is operably connected to the vehicle body. Selective actuation of the motor rotatably drives the drive nut assembly, which translates the drive nut and the leadscrew relative to one another and drives the passenger door between its open and closed positions.

In accordance with these and other aspects, a power swing door actuator mechanism for use in a power door actuation system in a vehicle having a vehicle body defining a door opening and a swing door pivotably connected to the vehicle body about a vertical axis for movement along a swing path between open and closed positions. The power swing door actuator mechanism includes a housing configured to be secured relative to the swing door with an electric motor mounted in the housing and including a drive spindle configured to be rotatably driven by the motor about a spindle axis. The drive spindle is operable to rotatably drive a drive nut assembly about a leadscrew axis of a leadscrew. The leadscrew is configured in threaded engagement with a drive nut of the drive nut assembly and is configured for connection to the vehicle body. Selective actuation of the motor rotatably drives the drive nut assembly, which translates the drive nut and the leadscrew relative to one another and drives the passenger door between its open and closed positions.

It is a further aspect of the present disclosure to configure the spindle axis and the leadscrew axis being laterally offset from one another, thereby providing for an axially compact package size of the actuator, which in turn reduces the available space needed to accommodate the actuator, and further reduces the moment of inertia effect of the actuator on the swing door.

It is a further aspect of the present disclosure to configure the drive nut assembly such that the lengthwise extending spindle axis and the lengthwise extending leadscrew axis pivot relative to one another as the drive nut translates along said leadscrew, thereby enhancing the pivotal freedom of the swing door relative to the vehicle.

It is a further aspect of the present disclosure to provide the drive spindle having a pinion gear fixed thereto and to provide a spur gear fixed to the drive nut assembly, wherein the pinion gear is in meshed engagement with the spur gear for driving the drive nut about the leadscrew axis to cause movement of the swing door relative to the vehicle.

It is a further aspect of the present disclosure to support an outer bushing of the drive nut assembly in the housing for rotation of the drive nut assembly within and relative to the housing via a plurality of bearings to minimize frictional resistance between the drive nut assembly and the housing during selective actuation of the motor.

It is a further aspect of the present disclosure to provide the drive nut with a spherical outer surface with a slot extending therein and to provide the spur gear having trunnion disposed in the slot in keyed relation to fix the spur gear for conjoint rotation about the leadscrew axis with the outer bushing of the drive nut assembly during selective actuation of the motor.

It is a further aspect of the present disclosure to provide the outer bushing having split halves to facilitate assembly and capturing the spur gear in fixed relation between the split halves.

It is a further aspect of the present disclosure to fix a position sensor fixed to the housing and to provide the drive spindle having a threaded region adjacent the position sensor with a magnetic member disposed in threaded engagement with the threaded region for translation along the threaded region in response to the selective actuation of the motor, whereupon translation of the magnetic member along the position sensor provides a signal to a vehicle controller as to the precise position of the door.

BRIEF DESCRIPTION OF THE DRAWINGS

These and other aspects, features, and advantages of the present disclosure will be readily appreciated, as the same becomes better understood by reference to the following detailed description when considered in connection with the accompanying drawings wherein.

DETAILED DESCRIPTION OF EXAMPLE EMBODIMENTS

In general, several example embodiments of a power door actuation system and power swing door actuator mechanism thereof constructed in accordance with the teachings of the present disclosure will now be disclosed. Each of the example embodiments is provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 1:
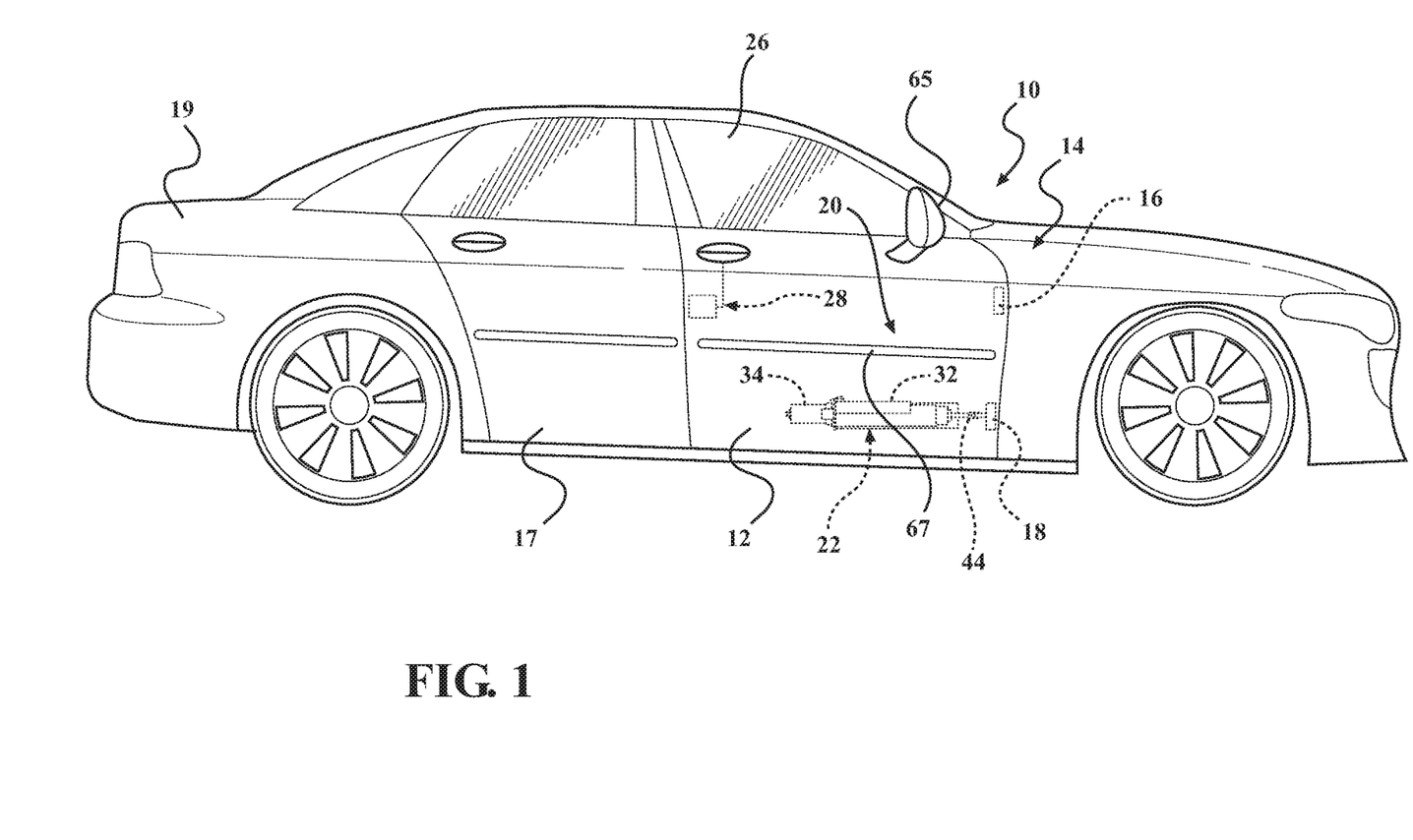
FIG. 1 is a side view of an example motor vehicle equipped with a power door actuation system situated between a front passenger swing door and a vehicle body and which is constructed in accordance with the teachings of the present disclosure.

Referring initially to FIG. 1, an example motor vehicle 10 is shown to include a first passenger door 12 pivotally mounted to a vehicle body 14 via an upper door hinge 16 and a lower door hinge 18 which are shown in phantom lines. In accordance with the present disclosure, a power door actuation system 20 is integrated to facilitate pivotal movement of the first passenger door 12 relative to the vehicle body 14. In accordance with a preferred configuration, power door actuation system 20 includes a power swing door actuator mechanism 22 secured within an internal cavity 24 of passenger door 12. The configuration of the power swing door actuator mechanism 22 provides an axially compact package or outer envelope, thereby allowing the power swing door actuator mechanism 22 to be incorporated into a relative small space within the internal cavity 24 of the door 12. Accordingly, space is made available for other components associated with the door 12, including a window 26 and all associated components thereof, as well as space for a door handle/latch assembly 28 and all associated components thereof, as well as for components of a vehicle sound system, such as a speaker. Selective actuation of the power door actuator mechanism 22 causes controlled pivotal movement of passenger swing door 12 relative to vehicle body 14.

Figure 3:
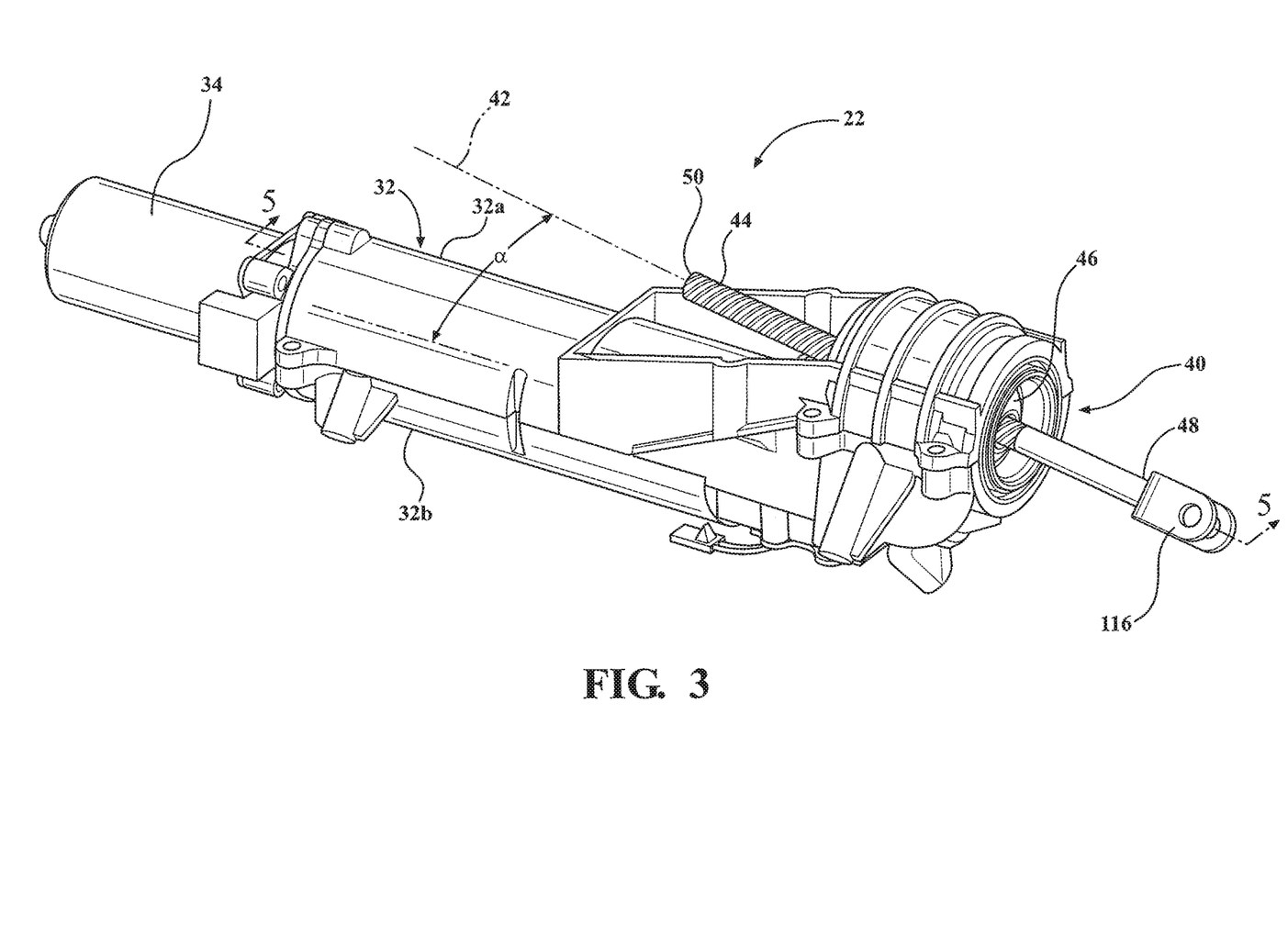
FIG. 3 is a perspective view of a power swing door actuator mechanism associated with the power door actuation system of the present disclosure.
Figure 4:
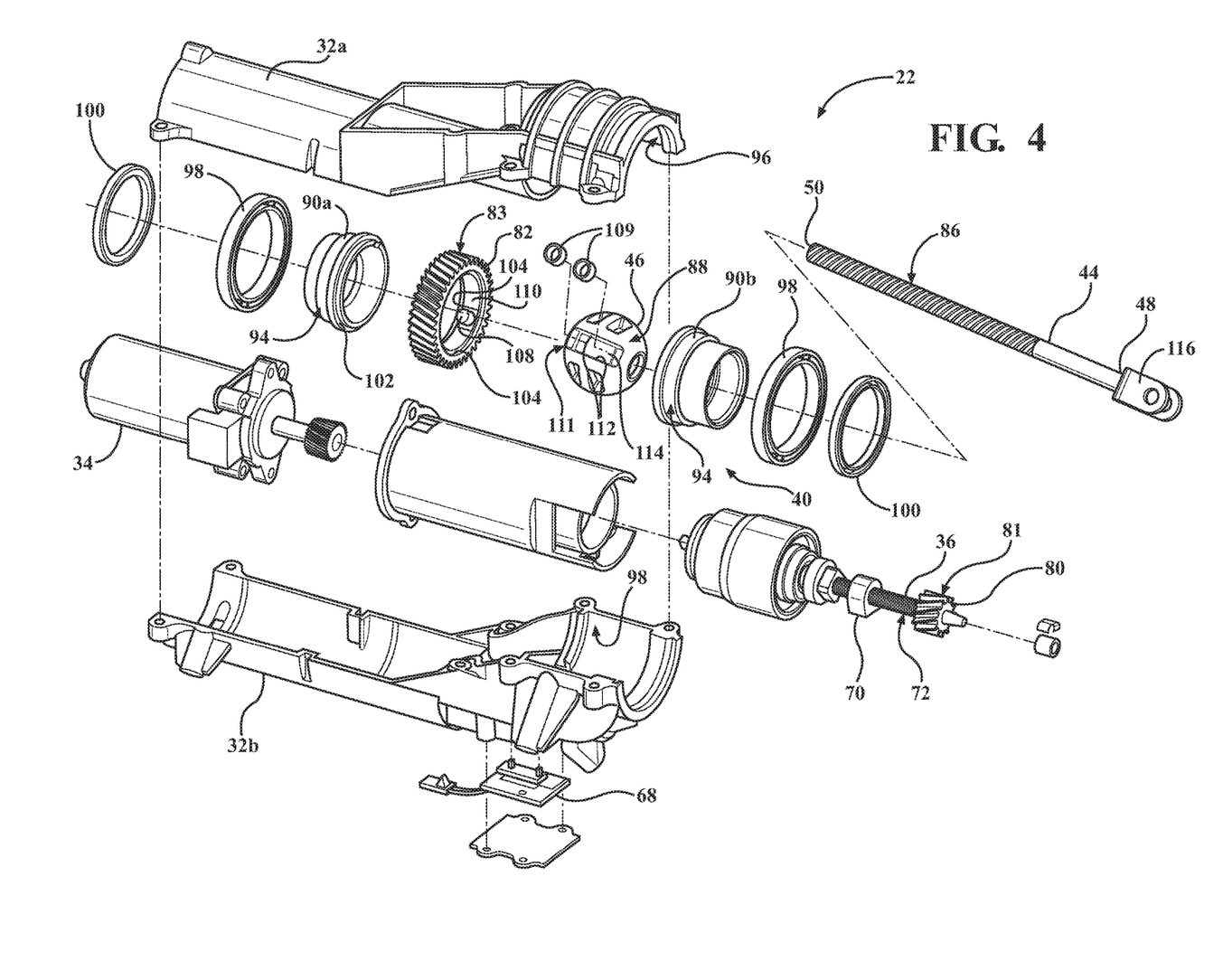
FIG. 4 is an exploded view illustrating various components of the power swing door actuator mechanism of FIG. 3.
Figure 5:
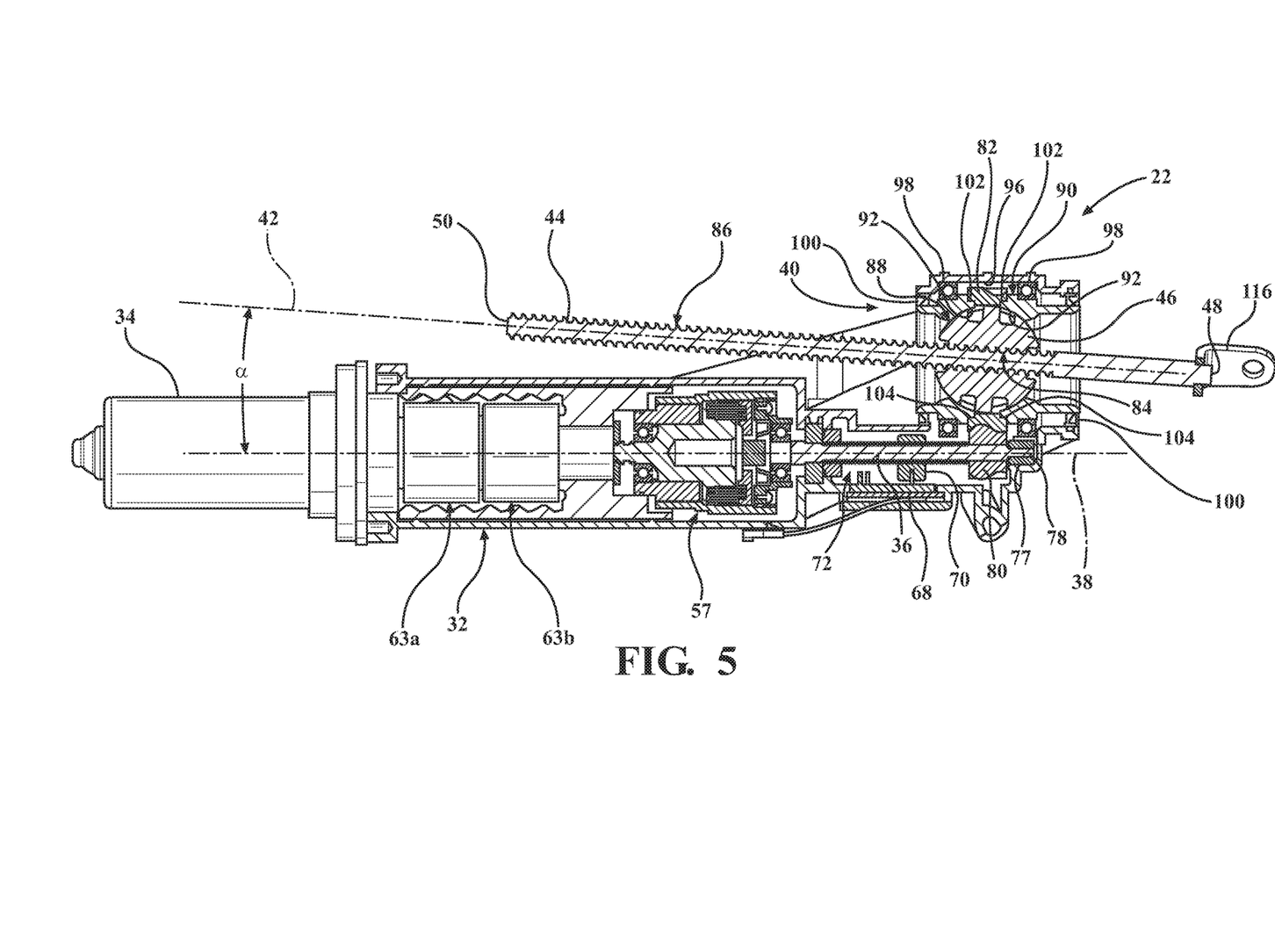
FIG. 5 is a cross-sectional view of the power swing door actuator mechanism of FIG. 3.
Figure 7:
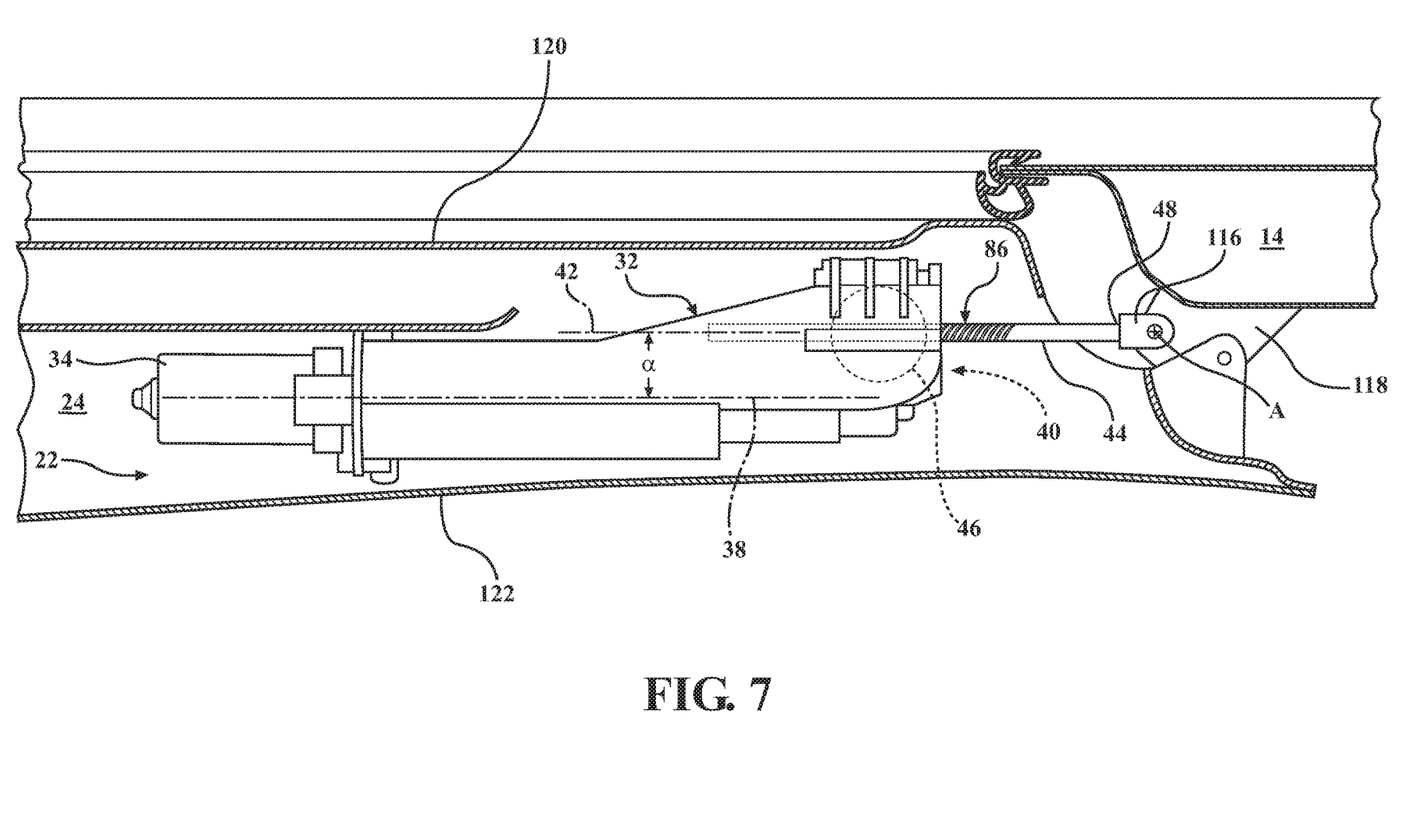
FIG. 7 is a top sectional view of the front passenger door shown in FIG. 1, with various components removed for clarity, in relation to a portion of the vehicle body and equipped with the power door actuation system with the vehicle door in a fully closed position.
Figure 8:
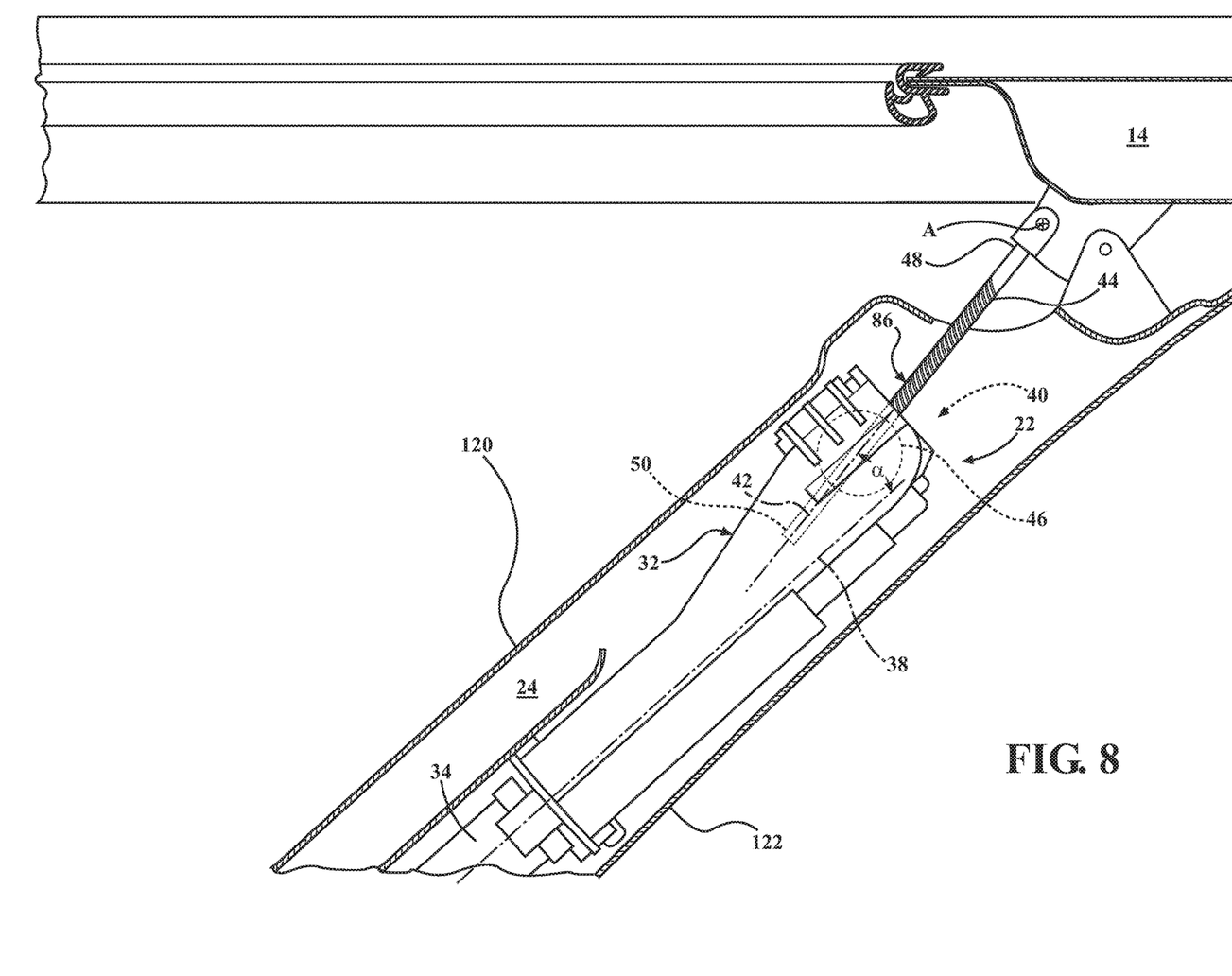
FIG. 8 is a view similar to FIG. 7 showing the power swing door actuator mechanism with the vehicle door in a partially opened, intermediate position.
Figure 9:
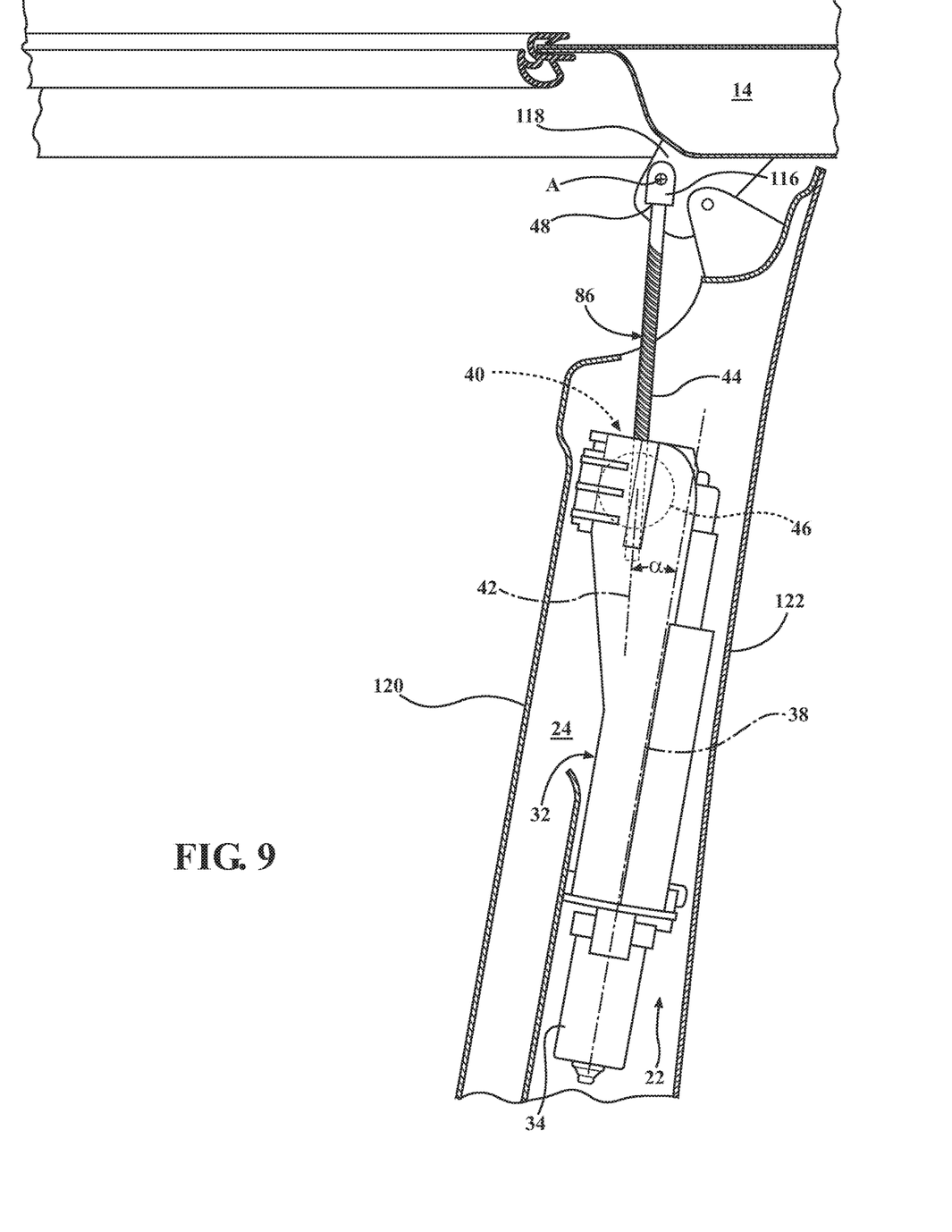
FIG. 9 is a view similar to FIG. 7 showing the power swing door actuator mechanism with the vehicle door in a fully opened position.

In accordance with a preferred configuration, the power door actuator mechanism 22 has a housing 32, shown, by way of example and without limitation, in FIG. 4 as having opposite halves 32a, 32b configured to be assembled to one another, and at least in part about the internal components discussed hereafter, and configured to be secured relative to the passenger door 12. In accordance with one non-limiting aspect, the housing 32 is shown fixed within the internal cavity 24 of the passenger door 12. As best shown in FIGS. 3 and 5, an electric motor 34 is mounted to the housing 32 and a drive shaft, also referred to as drive spindle 36 is operably configured to be rotatably driven by the electric motor 34 about a lengthwise extending, fixed spindle axis 38 (FIGS. 5, 7-9). The drive spindle 36 is operable to rotatably drive a drive nut assembly 40 about a lengthwise extending leadscrew axis 42 of a leadscrew 44. The leadscrew 44 is configured in threaded engagement with a drive nut 46 of the drive nut assembly 40 and an end 48 of the leadscrew 44 is configured for direct or operable connection to the vehicle body 14, with an opposite end 50 of the leadscrew 44 remaining free. Selective actuation of the electric motor 34, when desired to cause swing movement of the passenger door 12, rotatably drives the drive nut assembly 40 about the leadscrew axis 42, which causes the drive nut 46 to translate along the leadscrew 44, thereby selectively driving the passenger door 12 between its open and closed positions, such as shown in FIGS. 7-9. It is to be recognized that those skilled in the art will recognize that alternative packaging configurations to that illustrated for power door actuation system 20 are available to accommodate available packaging configurations and space. Further yet, while power door actuation system 20 is only shown in association with front passenger door 12, those skilled in the art will recognize that the power door actuation system can also be associated with any other door, panel or liftgate of vehicle 10, such as rear passenger doors 17 and decklid 19.

Figure 2:
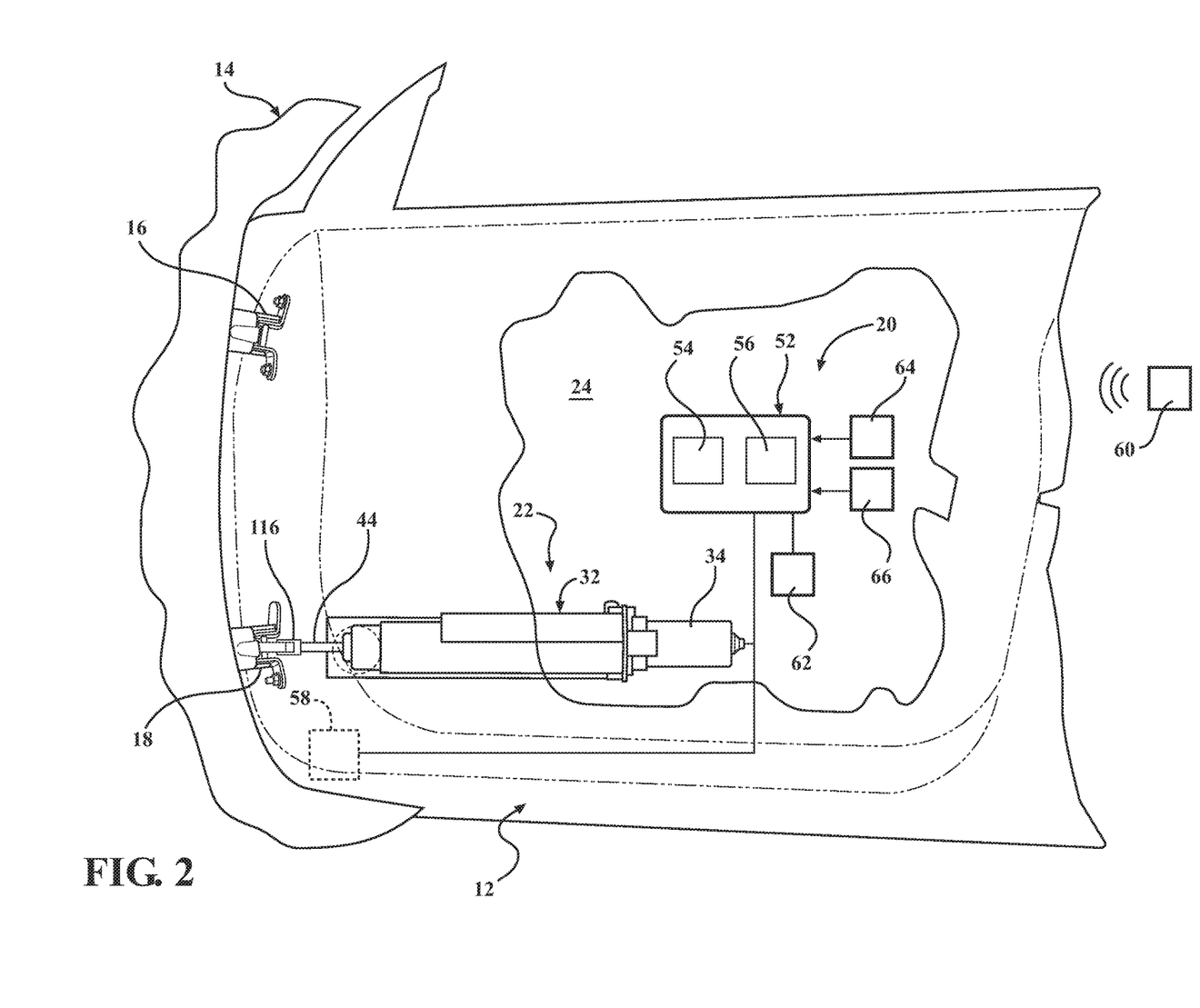
FIG. 2 is a broken away side view of the front passenger door shown in FIG. 1, with various components removed for clarity purposes only, in relation to a portion of the vehicle body and which is equipped with a power door actuation system constructed according to a first embodiment of the present disclosure.

Power door actuation system 20 is generally shown in FIG. 2 and, as mentioned, is selectively operable for controllably pivoting vehicle door 12 relative to vehicle body 14 between an open position and a closed position. As schematically shown in FIG. 2, an electronic control module (ECM) 52 is in communication with electric motor 34 for providing an electric control signal to electric motor 34 (i.e. in the form of a pulse width modulated voltage) for turning on and turning off electric motor 34 and selectively controlling its direction of output rotation. Electronic control module 52 can include a microprocessor 54 and a memory 56 having executable computer readable instructions stored thereon for carrying out the steps desired, such as those described in the non-limiting embodiment disclosed herein. Electronic control module 52 can also be configured to receive inputs and transmit outputs as described herein.

Although not expressly illustrated, electric motor 34 can include Hall-effect sensors for monitoring a position and speed of vehicle door 12 during movement between its open and closed positions. For example, one or more Hall-effect sensors may be provided and positioned to send signals to ECM 52 that are indicative of rotational movement of electric motor 34 and indicative of the rotational speed of electric motor 34, e.g., based on counting signals from the Hall-effect sensor detecting a target on a motor output shaft. In situations where the sensed speed of electric motor 34 is greater than a threshold speed and where the current sensor registers a significant change in the current draw, ECM 52 may determine that the user is manually moving door 12 while electric motor 34 is also operating to rotate drive nut assembly 40, thus translating drive nut assembly 40 along leadscrew 44 and moving vehicle door 12 between its open and closed positions. Electronic control module 52 may then send a signal to electric motor 34 to stop electric motor 34 and may even disengage a clutch 57 (if provided). Conversely, when ECM 52 is in a power open or power close mode and the Hall-effect sensors indicate that a speed of electric motor 34 is less than a threshold speed (e.g., zero) and a current spike is registered, ECM 52 may determine that an obstacle is in the way of vehicle door 12, in which case the electronic control system may take any suitable action, such as sending a signal to turn off electric motor 34. As such, ECM 52 receives feedback from the Hall-effect sensors to ensure that a contact obstacle has not occurred during movement of vehicle door 12 from the closed position to the open position, or vice versa.

Electronic control module 52 can be in communication with a remote key fob 60 or an internal/external handle switch 62 for receiving a request from a user to open or close vehicle door 12. Put another way, Electronic Control Module (ECM) 52 receives a command signal from either remote key fob 60 and/or internal/external handle switch 62 to initiate an opening or closing of vehicle door 12. Upon receiving a command, ECM 52 proceeds to provide a signal to electric motor 34 in the form of a pulse width modulated voltage (for speed control) to turn on electric motor 34 and initiate pivotal swinging movement of vehicle door 12. While providing the signal, electronic control module 52 also obtains feedback from the Hall-effect sensors of electric motor 34 or an encoder 58 to ensure that a contact obstacle has not occurred. The encoder 58, as shown in a non-limiting embodiment of FIG. 2, can be disposed adjacent lower door hinge 18 for sensing a relative position of the vehicle door 12 during pivotal movement between the open and closed positions. The encoder 58 can be disposed in communication with the ECM 52 and can provide information with regard to the relative position of the vehicle door 12 to electronic control module 52. As a result, electronic control module 52 may detect that a user wants to initiate manual movement of vehicle door 12 if signals from encoder 58 indicate relative movement of the vehicle door 12 at a time when electric motor 34 is not powered. If during movement of the vehicle door 12 no obstacle is present, electric motor 34 will continue to generate a rotational force to move the door 12 in accordance with the disclosure above. Once vehicle door 12 is positioned at the desired location, electric motor 34 is turned off and a "self-locking" gearing, such as can be associated with a planetary gearbox, such as primary and secondary gearboxes 63a, 63b, by way of example and without limitation, causes vehicle door 12 to continue to be held at that location. If a user tries to move vehicle door 12 to a different operating position, electric motor 34 will first resist the user's motion (thereby replicating a door check function) and eventually release and allow the door to move to the newly desired location. Again, once vehicle door 12 is stopped, ECM 52 will provide the required power to electric motor 34 to hold it in that position. If the user provides a sufficiently large motion input to vehicle door 12 (i.e., as is the case when the user wants to close the door), electronic control module 52 will recognize this motion via the Hall effect pulses and proceed to execute a full closing operation for vehicle door 12.

Figure 6:
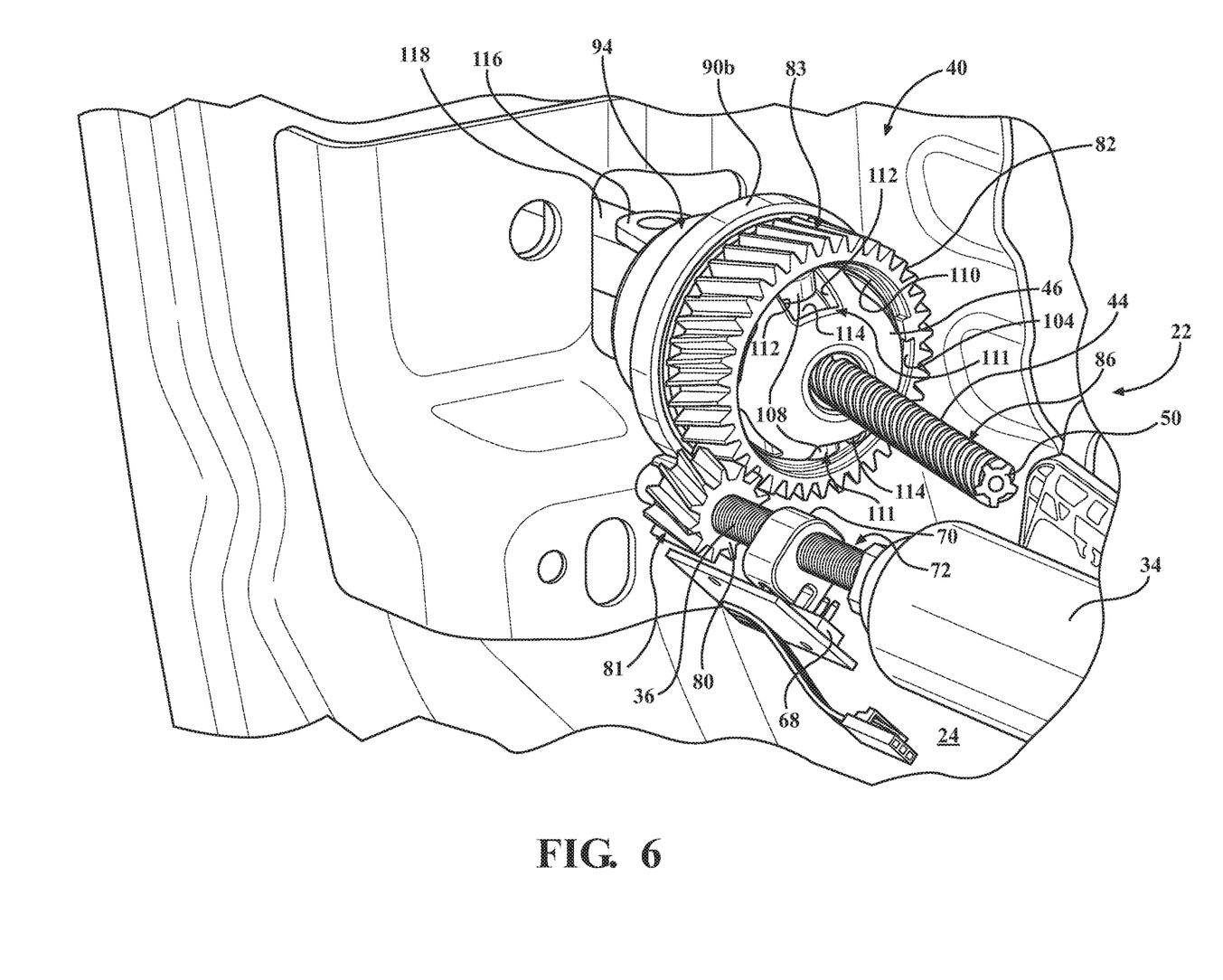
FIG. 6 is a fragmentary perspective view of the front passenger door shown in FIG. 1, with various components removed for clarity purposes only, in relation to a portion of the vehicle body illustrating the power swing door actuator mechanism fixed within an internal cavity of the front passenger door with a lead screw of the power swing door actuator mechanism operably fixed to the vehicle body.

Electronic control module 52 can also receive an additional input from an ultrasonic sensor 64, or other proximity sensor such as a radar based sensor, positioned on or in communication with a portion of vehicle door 12, such as on a door mirror 65, or the like. Ultrasonic sensor 64 assesses if an obstacle, such as another car, tree, or post, is near or in close proximity to vehicle door 12. If such an obstacle is present, ultrasonic sensor 64 will send a signal to ECM 52, and ECM 52 will proceed to turn off electric motor 34 to stop movement of vehicle door 12, and thus prevent vehicle door 12 from hitting the obstacle. This provides a non-contact obstacle avoidance system. In addition, or optionally, a contact obstacle avoidance system can be placed in vehicle 10 which includes a contact sensor 66 mounted to door, such as in association with a door molding component 67, and operable to send a signal to ECM 52. Further yet, as best shown in FIGS. 4-6, an absolute position sensor 68 can be fixed to the power door actuator mechanism 22, such as to the housing 32, for electrical/magnetic communication with an associated magnetic member 70 configured in threaded engagement with a threaded region 72 of drive spindle 36, such that rotation of the drive spindle 36 causes the magnetic member 70 to translate along the threaded region 72 in response to the selective actuation of the electric motor 34. The magnetic member 70 is caused to translate in a first direction along the threaded region 72 during a door opening event and to translate in an opposite second direction along the threaded region 72 during a door closing event, whereupon the absolute position sensor 68 detects the position of the movement of the magnetic member 70, which provides a signal to a vehicle controller, such as ECM 52, thereby indicating a precise position of the door 12.

Those skilled in the art will appreciate that any control strategy associated with known power door actuation systems can be used with power door actuation system 20. For example, the control strategy and modes disclosed in commonly-owned U.S. Pat. No. 9,174,517 (the '517 patent) can be readily adapted for use with the present disclosure with such disclosure of the '517 patent being incorporated herein by reference in its entirety.

As best shown in FIG. 5, power swing door actuation mechanism 22 includes electric motor 34, planetary gearbox 63, clutch 57, such as an electromechanical friction/magnetorheological fluid clutch, by way of example and without limitation, and output shaft, referred to above as drive spindle 36, with drive spindle 36 being interconnected at a first end to an output member of clutch 57 and being supported for rotation via a bearing 77 at an opposite second end 78. The drive spindle 36 further includes a pinion gear 80 fixed thereto, wherein the pinion gear 80 has outwardly extending pinion teeth 81 in meshed engagement with a spur gear 82 fixed to the drive nut assembly 40 for selectively driving the drive nut 46 about the leadscrew axis 42 to cause movement of the passenger swing door 12 relative to the vehicle body 14, as discussed above and in more detail hereafter.

In one configuration, the clutch 57 would normally be engaged without power (i.e. power-off engagement) and could be selectively energized (i.e. power-on release) to disengage. Put another way, the clutch 57 would drivingly couple drive spindle 36 to planetary gearbox 63 without the application of electrical power while the clutch 57 would require the application of electrical power to uncouple drive spindle 36 from driven connection with planetary gearbox 63a, 63b. As an alternative, the clutch 57 could be configured in a power-on engagement and power-off release arrangement. The clutch 57 may engage and disengage using any suitable type of clutching mechanism such as, for example, a set of sprags, rollers, a wrap-spring, friction plates, or any other suitable mechanism. The clutch 57 is provided to permit door 12 to be manually moved by the user between its open and closed positions relative to vehicle body 14. It is contemplated herein that an optional location for such a disconnect clutch could be located between the output of electric motor 34 and the input to planetary gearbox 63a, 63b. The location of this optional clutch location is dependent based on, among other things, whether or not planetary gearbox 63 includes "back-driveable" gearing.

The drive nut assembly 40 includes the drive nut 46, which is configured having a generally cylindrical through bore with an internal thread 84 in meshed, threaded engagement with an external thread 86 of the leadscrew 44 and a spherical outer surface 88, an outer bushing 90 and the spur gear 82. The outer bushing 90 is shown in a non-limiting embodiment as having split halves 90a, 90b to facilitate assembly and to facilitate capturing the spur gear 82 in fixed relation between the split halves 90a, 90b for conjoint rotation therewith. With the halves 90a, 90b assembled, the outer bushing 90 forms a spherical bearing inner race, also referred to as spherical inner surface 92, sized for snug, smooth (low friction) pivoting motion of spherical outer surface 88 of drive nut 46 therewith. The outer bushing 90 has a generally cylindrical outer surface 94, formed by halves 90a, 90b, sized for loose receipt in a bore of housing 32, with the housing bore being bounded by an inner surface 96 of housing 32, wherein a plurality, and shown as a pair, of bearings 98 are disposed in captured receipt between the outer surface 94 of outer bushing 90 and the inner surface 96 to fix outer bushing 90 for rotation within bore with minimal frictional resistance between the drive nut assembly 40 and the housing 32 during selective actuation of the electric motor 34. To further facilitate retention of the outer bushing 90 in the bore beyond the retention provided by bearings 98, and to further facilitate retaining lube, if included within the drive nut assembly 40, and to prevent the ingress of contamination, seals 100 can be disposed axially outwardly from bearings 98 in a snug fit between the outer surface 94 and the inner surface 96, with seals 100 providing for free, low friction rotation of the drive nut assembly 40 within the bore of housing 32, as will be readily understood by a skilled artisan. It is contemplated that a snap ring or other type of retaining feature could be used to further facilitate retaining drive nut assembly 40 in the bore, if desired. As mentioned above, spur gear 82 is captured between the outer bushing 90 halves 90a, 90b, with each of the halves 90a, 90b being shown having a reduced diameter (relative to cylindrical outer surface 94) annular shoulder 102 sized for receipt within an annular counterbore 104 on opposite sides of spur gear 82.

The spur gear 82, as discussed above, is fixed to the outer bushing 90 for rotation therewith and, in the non-limiting embodiment, is shown fixed between the two halves 90a, 90b of outer bushing 90. As mentioned, spur gear 82 has radially outwardly facing spur gear teeth 83, wherein the spur gear teeth 83 are spaced in clearance relation with the inner surface 96 of housing 32 for free rotation therein, with bearings 98 providing such clearance. Spur gear teeth 83 are meshed with pinion teeth 81. As best shown in FIGS. 4 and 6, the spur gear 82 has one or more trunnions 108 extending radially inwardly from an inner surface 110, with the trunnions 108 being configured to engage drive nut 46 for conjoint rotation of spur gear 82 and drive nut 46 about leadscrew 44.

The drive nut 46 is threaded on leadscrew 44 for translation therealong in response to selective actuation of electric motor 34. The spherical outer surface 88 of drive nut 46 has one or more recessed slots 111 configured for receipt of respective trunnions 108 therein. The slots 111 extend lengthwise along the spherical outer surface 88 in generally parallel relation with leadscrew axis 42 and have a width, extending generally transverse to leadscrew axis 42 between opposite generally flat shoulders 112, sized for close receipt of trunnions 108 therein. Accordingly, the width of each slot 111 is only slightly larger than the corresponding dimension of trunnions 108 which may be provided with bushings 109 extending thereover, such that the trunnions 108 are effectively keyed for lengthwise translation within slot 111 so that rotation of trunnions 108 in opposite directions about leadscrew axis 42 causes immediate engagement of trunnions 108 with shoulders 112, thereby resulting in minimal slop or play of drive nut 46 relative to spur gear 82, thus, causing coincident rotational movement of drive nut 46 with spur gear 82 in opposite rotational directions. The slots 111 are also formed having an arcuate, convex radially outwardly facing floor or base 114 extending along the lengthwise direction parallel to leadscrew axis 42 to allow drive nut 46 to pivot freely with leadscrew 44 in gimbal-like fashion within spur gear 82. Accordingly, the base 114 is shaped to remain in clearance relation from ends of trunnions 108 as the drive nut 46 and leadscrew 44 pivot relative to spur gear 82 and outer bushing 90.

The leadscrew 44 is received in threaded engagement within drive nut 46 and has a sufficient length extending along leadscrew axis 42 such that when the passenger door 12 is in a fully opened position, the leadscrew external threads 86 remain in threaded engagement with drive nut internal threads 84. The end 48 of leadscrew 44 is configured for direct or operable attachment to the vehicle body 14, and is shown in an exemplary, non-limiting embodiment as having an attachment feature in the form of a yoke 116 configured for pivotal attachment to a post 118 extending from an A-pillar of vehicle body 14, such as via a pin or other fastening mechanism. As such, leadscrew 44 is free to pivot in swinging motion about a pivot axis A with the passenger door 12 as the passenger door 12 swings between the closed and open position, as will be readily appreciated by one skilled in the art.

With the above description of individual components and interaction therebetween, it can be appreciated that the power swing door actuator mechanism 22 is compact and powerful (due in large part to the torsion force acting between pinion gear 80 and spur gear 82), thereby being able to be deployed in relatively small areas of the door internal cavity 24, thus, leaving space for other components associate with the door 12. Contributing to the axially compact package size is the laterally offset relation of the leadscrew 44 with drive spindle 36. As such, rather than the package having a length of the combined drive spindle 36 and leadscrew 44 lengths, the axial package length is merely a fraction of such combined length, such as up to about 50 percent or less of the combined length of the drive spindle 36 and leadscrew 44, given their relative lateral spacing and lengthwise overlapping relation with one another, as will be appreciate by one skilled in the art. With the axial length of the package being significantly reduced, a further benefit recognized includes a reduction in the moment of inertia effect of the power swing door actuator mechanism 22 on the swing door 12, due to a reduced amount of mass extending outwardly from the hinges 16, 18 of passenger door 12, thereby locating the center of mass of the passenger door 12 nearer the pivot axis of hinges 16, 18.

FIGS. 7-9 show an embodiment of a power swing door actuator mechanism 22 disposed within the internal cavity 24, bounded by respective inner and outer door panels 120, 122, in operation to move the vehicular swing door 12 between a closed position, a mid-position, and an open position, respectively. The swing door 12 is pivotally mounted on at least one hinge, such as to lower hinge 18 connected to the vehicle body 14 (not shown in its entirety), by way of example and without limitation, for rotation about vertical axis A. For greater clarity, the vehicle body 14 is intended to include the 'non-moving' structural elements of the vehicle such as the vehicle frame (not shown) and body panels (not shown).

In normal operation the power swing door actuator mechanism 22 can be disengaged to allow for manual movement of the swing door 12 by applying power (i.e. energizing) to the clutch 57, in which case the electric motor 34 and planetary gearbox 63 will be decoupled from the drive spindle 36. An example of a suitable slip torque that may be selected for the clutch 57 may be in the range of about 2 Nm to about 4 Nm, by way of example and without limitation. The slip torque that is selected for a particular application may depend on one or more of several factors. An example factor based on which the slip torque may be selected is the weight and/or geometry of the passenger door 12. Yet another example factor based on which the slip torque may be selected is the amount of incline on which the vehicle 10 is intended to be parked while still ensuring that the passenger door 12 is holdable in any position.

The power door actuation system 20, as mentioned above, provides a mechanism and means for speed control and obstacle detection. Speed control is attained by the ECM 52 monitoring the Hall-effect signals and/or a signal from the absolute position sensor 68. Either signal could be eliminated depending on the desired control features and redundancy requirements. The absolute position sensor 68 is however highly desired for providing the position of the door 12 upon power up or in case of power loss.

As shown schematically in FIG. 1, a mounting arrangement for power swing door actuator mechanism 22 is shown within door 12 for powered movement relative to vehicle body 14. In FIG. 1, one preferred mounting is shown to be low in door 12, such as below a speaker (not shown) and in cooperation with an area adjacent lower door hinge 18, though it is to be recognized that any desired location within internal cavity 24 can be utilized to mount power swing door actuator mechanism 22.

Power swing door actuator mechanism 22 is configured to utilize the drive nut 46 as the rotary component and the leadscrew 44 as the non-rotary extensible member. By rotating the drive nut 46 in gimbal-like fashion, as described and shown, the angle (a) of the leadscrew axis 42 relative to the spindle axis 38 of coaxially aligned electric motor 34, planetary gearbox 63 and drive spindle 36 can be freely and continuously varied during assembly and during actuation, such as between 0-30 degrees or more, by way of example and without limitation, as illustrated in the various states of actuation in FIGS. 7-9, for improved packaging and improved pivotal freedom during movement of the door 12 between the opened and closed positions. Thus, the leadscrew 44 functions as the extensible member, in response to the drive nut 46 translating along and relative to the leadscrew 44, thereby driving the leadscrew 44 in pivotably coupled relation to the door 12 to provide improved packaging since the angulation relative to the drive mechanism can be varied to meet specific packaging requirements.

During actuation, the electric motor 34 is selectively actuated, such as via a command from ECM 52, to rotatably drive the drive spindle 36 about spindle axis 38. The clutch 57 is operable to maintain drive spindle 36 in rotating connection with electric motor 34 to pivot the passenger door 12 between the opened and closed positions, and to allow disconnected relative rotation between electric motor 34 and drive spindle 36, such as during impact or imminent impact with an object or in case of the user applying a force to the passenger door 12, as discussed above. During connected rotation of drive spindle 36 with electric motor 34, the magnetic member 70 traverses along the threaded region 72 of drive spindle 36 whereupon absolute position sensor 68 detects the movement and position of the magnetic member 70, which in turns communicates with ECM 52. ECM 52 correlates the position of magnetic member 70 with a precise position of passenger door 12.

During rotation of drive spindle 36, pinion gear 80 rotatably drives spur gear 82 and outer bushing 90 fixed to spur gear 82. Rotation of spur gear 82 causes conjoint rotation of drive nut 46 via coupling of trunnions 108 within slots 111. Trunnions 108 engage and drive a respective shoulder 112, thereby causing drive nut 46 to rotate about leadscrew 44, which in turn drives drive nut 46 in a corresponding axial direction along leadscrew 44 to pivot passenger door 12 in one of an opening or closing direction, depending on the direction of rotation of drive nut 46. As the leadscrew 44 translates relative to the drive nut 46 through the bore bounded by inner surface 96 of outer bushing 90, the leadscrew axis 42 pivots relative to spindle axis 38, thereby causing continuous change of angel α therebetween, which is freely permitted via gimbal-like action provided by spherical outer surface 88 pivoting against spherical inner surfaces 92 of outer bushing halves 90a, 90b and free pivotal movement of trunnions 108 in slots 111. Accordingly, leadscrew 44 is able to tilt freely relative to drive spindle 36 as the door 12 moves controllably and with precision between the opened and closed positions.

In view of the above, the power door actuation system 20 provides several advantages, including: optimized packaging, reduced effect on the door's mass moment of inertia, generation of increased torque with a reduced size motor to precisely control pivotal door movement and replicate the door check functionality, reduced amount of binding throughout the power swing door actuator mechanism 22 of the power door actuation system 20 as a result of increased freedom of gimbal-like motion provided by the drive nut assembly 40, which in turn reduces the stress (current draw) on the electric motor 34, with other advantages likely to be recognized by the skilled artisan in view of the disclosure herein.

The foregoing description of the several embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example detection system can likewise be implemented into many other systems to control one or more operations and/or functions.

What is claimed is:

1. A power door actuation mechanism for moving a door of a motor vehicle between open and closed positions relative to a vehicle body, the power door actuation mechanism, comprising:
a housing configured to be secured relative to the door against movement relative to a fixed spindle axis with an electric motor mounted to said housing and including a drive spindle configured to be rotatably driven by said electric motor about said fixed spindle axis, said drive spindle being operable to rotatably drive a drive nut assembly about a leadscrew axis of a leadscrew, said leadscrew being configured in threaded engagement with a drive nut of said drive nut assembly and being configured for connection to the vehicle body, wherein selective actuation of said electric motor rotatably drives said drive nut assembly, which translates said drive nut and said leadscrew relative to one another and drives the door between the open and closed positions, wherein said fixed spindle axis does not change orientation relative to the door as the door moves between the open and closed positions.

2. The power door actuation mechanism of claim 1, wherein said spindle axis and said leadscrew axis are laterally offset from one another.

3. The power door actuation mechanism of claim 2, wherein said spindle axis and said leadscrew axis pivot relative to one another as said drive nut translates along said leadscrew.

4. The power door actuation mechanism of claim 3, wherein said spindle axis is configured to extend along a first angle of inclination relative to said leadscrew axis when the door is in the closed position and said spindle axis is configured to extend along a second angle of inclination relative to said leadscrew axis when the door is in the open position, said second angle of inclination being greater than said first angle of inclination.

5. The power door actuation mechanism of claim 1, further comprising a position sensor fixed to said housing, said drive spindle having a threaded region adjacent said position sensor with a magnetic member in threaded engagement with said threaded region for translation along said threaded region in response to the selective actuation of said electric motor.

6. The power door actuation mechanism of claim 5, wherein said magnetic member is fixed against rotation relative to said housing.

7. The power door actuation mechanism of claim 1, wherein said housing is configured to be secured within a cavity of the door.

8. A power door actuation mechanism for moving a door of a motor vehicle between open and closed positions relative to a vehicle body, the power door actuation mechanism, comprising:
a housing configured to be secured relative to the door with an electric motor mounted to said housing and including a drive spindle configured to be rotatably driven by said electric motor about a spindle axis, said drive spindle being operable to rotatably drive a drive nut assembly about a leadscrew axis of a leadscrew, said leadscrew being configured in threaded engagement with a drive nut of said drive nut assembly and being configured for connection to the vehicle body, wherein selective actuation of said electric motor rotatably drives said drive nut assembly, which translates said drive nut and said leadscrew relative to one another and drives the door between the open and closed positions, wherein said drive nut is bounded at least in part by an outer bushing of said drive nut assembly, said drive nut being pivotal within said outer bushing.

9. The power door actuation mechanism of claim 8, further including a pinion gear fixed on said drive spindle and a spur gear extending about said drive nut, said pinion gear being in meshed engagement with said spur gear for driving said drive nut about said leadscrew axis.

10. The power door actuation mechanism of claim 9, further including a plurality of bearings supporting said outer bushing for rotation within said housing.

11. The power door actuation mechanism of claim 9, wherein said drive nut is bounded at least in part by a spherical surface of the outer bushing and said drive nut has a spherical outer surface with a slot extending into said spherical outer surface and said spur gear has trunnion disposed in said slot to fix said spur gear for conjoint rotation with said outer bushing about said leadscrew axis.

12. The power door actuation mechanism of claim 9, wherein said outer bushing has split halves, said spur gear being disposed between said split halves.

13. A power door actuation system for moving a door of a motor vehicle between open and closed positions relative to a vehicle body, the power door actuation system, comprising:
a vehicle control module; and
a power door actuation mechanism configured in electrical communication with said vehicle control module, said power door actuation mechanism including a housing configured to be secured along a fixed spindle axis in a cavity of the door with an electric motor mounted to said housing and including a drive spindle configured to be rotatably driven by said electric motor about said fixed spindle axis, said drive spindle being operable to rotatably drive a drive nut assembly about a leadscrew axis of a leadscrew, said leadscrew being configured in threaded engagement with a drive nut of said drive nut assembly and being configured for connection to the vehicle body, wherein selective actuation of said electric motor rotatably drives said drive nut assembly, which translates said drive nut and said leadscrew relative to one another and drives the door between the open and closed positions, wherein said fixed spindle axis does not change orientation relative to the door as the door moves between the open and closed positions.

14. The power door actuation system of claim 13, wherein said fixed spindle axis and said leadscrew axis are laterally offset from one another, wherein said fixed spindle axis and said leadscrew axis pivot relative to one another as said drive nut translates along said leadscrew in response to receiving a signal from said vehicle control module.

15. The power door actuation system of claim 13, further comprising a position sensor fixed to said housing in electrical communication with said vehicle control module, said drive spindle having a threaded region adjacent said position sensor with a magnetic member in threaded engagement with said threaded region for translation along said threaded region in response to the selective actuation of said electric motor.

16. A power door actuation system for moving a door of a motor vehicle between open and closed positions relative to a vehicle body, the power door actuation system, comprising:

a vehicle control module; and a power door actuation mechanism configured in electrical communication with said vehicle control module, said power door actuation mechanism including a housing configured to be secured in a cavity of the door with an electric motor mounted to said housing and including a drive spindle configured to be rotatably driven by said electric motor about a spindle axis, said drive spindle being operable to rotatably drive a drive nut assembly about a leadscrew axis of a leadscrew, said leadscrew being configured in threaded engagement with a drive nut of said drive nut assembly and being configured for connection to the vehicle body, wherein selective actuation of said electric motor rotatably drives said drive nut assembly, which translates said drive nut and said leadscrew relative to one another and drives the door between the open and closed positions, wherein said drive nut is bounded at least in part by an outer bushing of said drive nut assembly, said drive nut being pivotal within said outer bushing.

17. The power door actuation system of claim 16, further including a pinion gear fixed on said drive spindle and a spur gear extending about said drive nut, said pinion gear being in meshed engagement with said spur gear for driving said drive nut about said leadscrew axis.

18. The power door actuation system of claim 17, further including a plurality of bearings supporting said outer bushing for rotation within said housing.

19. The power door actuation system of claim 17, wherein said drive nut is bounded at least in part by a spherical surface of the outer bushing and said drive nut has a spherical outer surface with a slot extending into said spherical outer surface and said spur gear has trunnion disposed in said slot to fix said spur gear for conjoint rotation with said outer bushing about said leadscrew axis.

20. The power door actuation system of claim 17, wherein said outer bushing has split halves, said spur gear being disposed between said split halves.

\* \* \* \* \*